United States Patent
Panarello et al.

(12) 
(10) Patent No.: US 6,289,370 B1
(45) Date of Patent: Sep. 11, 2001

(54) PLATFORM INDEPENDENT ENHANCED HELP SYSTEM FOR AN INTERNET ENABLED EMBEDDED SYSTEM

(75) Inventors: Gregory Panarello, Holliston; Joseph W. Bermann, Hopedale; Alexander Koifman, Waltham; John Carl Scano, Dracut, all of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/201,039

(22) Filed: Nov. 30, 1998

(51) Int. Cl.[7] ................................................ G06F 15/16
(52) U.S. Cl. .................... 709/200; 709/203; 709/227; 709/228; 709/229; 345/338; 707/501
(58) Field of Search ..................... 709/228, 311, 709/200, 203, 227, 229; 345/338, 329, 346, 336; 707/501

(56) References Cited

U.S. PATENT DOCUMENTS

| | | | |
|---|---|---|---|
| 5,826,242 | * 10/1998 | Montulli ............................. | 709/228 |
| 5,877,757 | * 3/1999 | Baldwin et al. .................... | 345/336 |
| 5,933,139 | * 8/1999 | Feigner et al. ..................... | 345/338 |
| 5,933,140 | * 8/1999 | Strahorn et al. ................... | 345/338 |
| 5,940,614 | * 8/1999 | Allen et al. ........................ | 345/357 |
| 6,102,967 | * 8/2000 | Feigner et al. ..................... | 345/338 |
| 6,133,917 | * 10/2000 | Feigner et al. ..................... | 345/338 |

* cited by examiner

*Primary Examiner*—Dung C. Dinh
*Assistant Examiner*—Chuong Ho
(74) *Attorney, Agent, or Firm*—Weingarten, Schurgin, Gagnebin & Hayes LLP

(57) ABSTRACT

A system for providing help contents to a client system on behalf of a web enabled embedded system. A help file is loaded onto a server system, and the location of the server system is communicated to the embedded system. A client system requests a page of data stored in the embedded system. In response to the client system request, the embedded system forms a data page including one or more instructions for displaying a help button. The data page includes one or more instructions associating the help file on the server system with the help button. The embedded system transmits the data page to the client system. The client system then processes the data page to form a view on a display device. In response to assertion of the help button, the client system retrieves the help file from the server system and processes the help file. In an example embodiment, a configuration dialog box is displayed on the client system. The configuration dialog box is used to receive the location of the server system from a user interface on the client system. The location of the server system is transmitted from the client system to the embedded system.

41 Claims, 10 Drawing Sheets

PLATFORM INDEPENDENT ENHANCED HELP SYSTEM FOR AN INTERNET ENABLED EMBEDDED SYSTEM

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The invention relates generally to systems for enhancing data contents provided to a user from an embedded system, and more specifically to a system for delivering high bandwidth, varied help information to a user for an embedded system in a network switch.

As microprocessors have become increasingly inexpensive, they have become commonly used in devices or products other than traditional computer systems. When a microprocessor is included within a system which has a primary, dedicated function other than general purpose computing, and where that primary function is substantially performed by other components of the device acting independently from the microprocessor, that microprocessor is said to be part of a subsystem that is "embedded" within the device. Some typical characteristics of embedded systems are that (1) they have a limited set of resources, (2) the resources they have are not easily extensible, and (3) they are required to perform "real-time" operations. Examples of embedded systems are in input output (I/O) controllers which interface an I/O device to a general purpose computer, network controllers which interface a general purpose computer to a computer network, and dedicated communications devices such as network switches, bridges and routers. Recently, embedded systems have been included within less sophisticated products. Such products for example include some types of home appliances, such as security systems, fire alarms, and entertainment systems.

The cost of the embedded system designs must generally be kept low with relation to the overall product cost. For this reason, the amount of memory typically included to store instructions or data within an embedded system is relatively limited.

A function typically performed by such embedded systems is to provide information to a user regarding how to use, configure and potentially trouble-shoot a device. For example, an embedded system in a network switch may be responsible for communicating with a user regarding how the internal resources of the switch can be set-up for various network topologies. The embedded system may also be responsible for communicating with a user regarding how to diagnose problems encountered while using the product. At the same time, the methods available for user communications, and specifically the types of data that are used to communicate with a user, are becoming more varied. Multimedia content is increasingly the standard for user level communications, including for example, digitized video and sound together with highly complex graphics. However, such rich information formats typically require large data files to store the data which is eventually communicated to the user. In addition, users prefer an interface including varied types of multimedia information. As a consequence, the amount of memory available within the embedded systems of existing devices is insufficient to store the data files needed to support the rich and varied user communications which are becoming more and more prevalent.

When multiple devices of the same type are in use, and such devices use common data files related to user communications, issues arise in coordinating the updates of such content files, in order to ensure that users are presented with a consistent description of the device's operation. Moreover, the information provided to users of the multiple devices should be processible on various types of client systems. In other words, the embedded system must be able to support communications with users on various client systems on a platform independent basis. Update synchronization and varied platform support problems are exacerbated by the minimal resources available in typical embedded systems.

Thus it would be desirable to have a system for providing information to multiple client platforms from an embedded system, where the system is capable of providing large amounts of varied types of data, including data in multimedia formats, such as sound and video.

BRIEF SUMMARY OF THE INVENTION

In accordance with the invention there is disclosed a system for providing information to a client system on behalf of an embedded system. In the disclosed system a contents file is installed or loaded onto a server system, and the location of the server system is communicated to the embedded system. A client system requests a page of data stored in the embedded system. In response to the client system request, the embedded system forms a data page including one or more instructions for displaying a button, for example a help button, to a user of the client system. The data page includes one or more instructions associating the help file on the server system with the help button.

The embedded system transmits the data page to the client system. The client system then processes the data page to form a view on a display device. As a result of such processing, and in response to selection of the help button by the user of the client system, the client system retrieves the contents file from the server system and processes the contents file on the client system.

In an exemplary embodiment, a configuration dialog box is displayed on the client system. The configuration dialog box is used to receive the location of the server system from a user interface of the client system. Alternatively, the location of the server system is transmitted from the client system to the embedded system.

In an alternative embodiment, a message is transmitted from the server' system to the embedded system indicating that the contents file has been installed on the server system.

In another embodiment, an HTTP request is sent from a browser program on the client system to the embedded system, responsive to an indication of the location of the embedded system to the browser program from a user interface on the client system.

The above described system for providing information to client systems on behalf of an embedded system is advantageously capable of providing large amounts of varied types of data, including data in multimedia formats, such as sound and video. The system facilitates synchronization of content file updates, and is capable of supporting multiple client platforms.

BRIEF DESCRIPTION OF THE DRAWINGS

The invention will be more fully understood by reference to the following detailed description of the preferred embodiments in conjunction with the drawings of which.

DETAILED DESCRIPTION OF THE PREFERRED EMBODIMENTS

Figure 1:
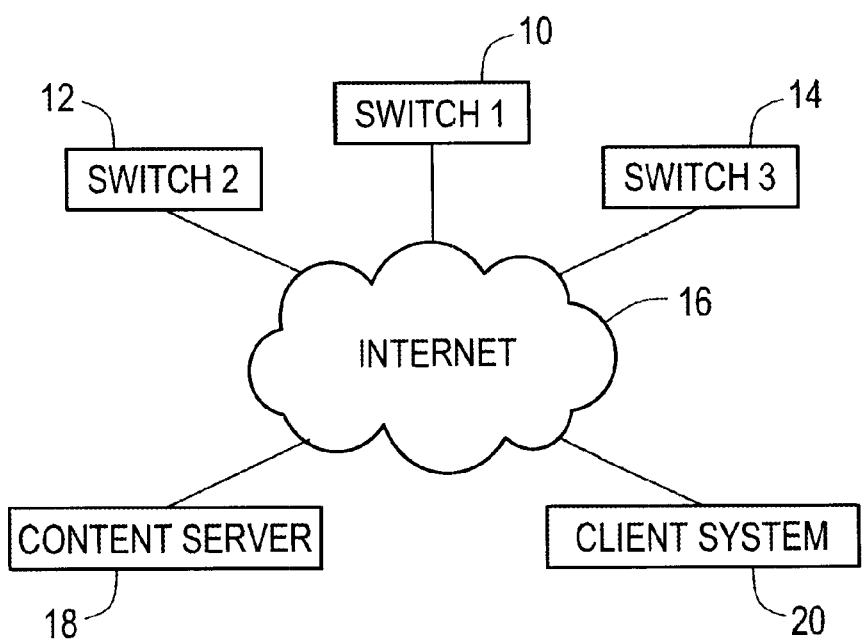
FIG. 1 is a block diagram showing an example environment in which the disclosed system may be embodied.

A system for providing enhanced information to a remote client on behalf of an embedded system is disclosed. FIG. 1 shows an exemplary environment in which the disclosed system maybe embodied. In FIG. 1 there are shown network switch 1 10, network switch 2 12, network switch 3 14, content server 18 and client system 20, all coupled to the internet 16. A user on the client system 20 communicates through the internet 16 with embedded systems in the network switches, and with the content server 18 to obtain information regarding operation and configuration of the network switches.

Figure 2:
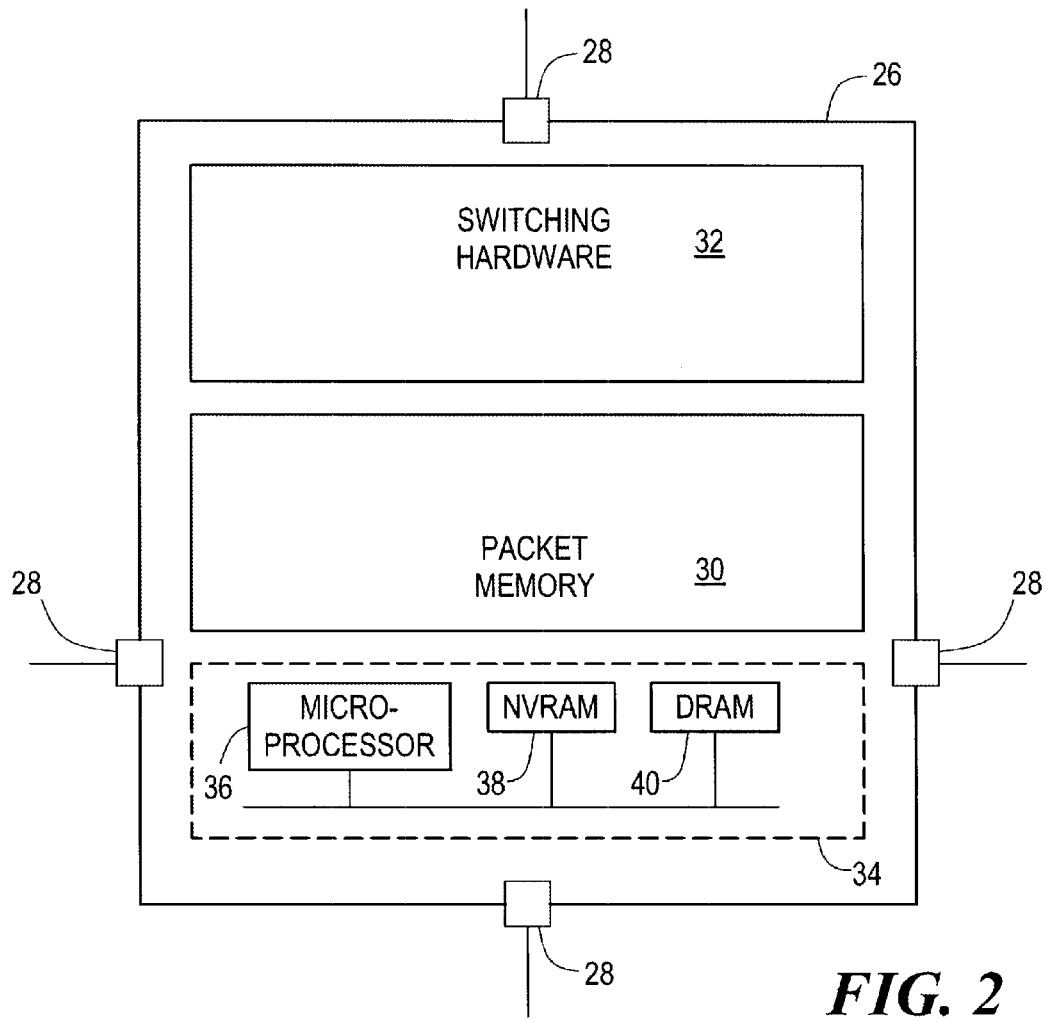
FIG. 2 is a block diagram showing an example embodiment of a product including an embedded system.

FIG. 2 shows an example of a product including an embedded system and illustrates in more detail one of the network switches shown in FIG. 1. For example, network switch 10 includes switching hardware 32, a packet memory 30, an embedded system 34 and network connections 28. The embedded system 34, for example, includes a microprocessor 36, a non-volatile store (for example NVRAM) 38 and volatile store (for example DRAM) 40. During operation of the switch depicted in FIG. 2, the switching hardware 32 performs forwarding of data units received on network connections 28 and stored in the packard memory 30. The microprocessor 36 in the embedded system 34 executes instructions stored in the DRAM 40. The code image may be stored within the NVRAM 38 for shipment, and transferred to the DRAM 40 for execution. In the embodiment of FIG. 2, the embedded system 34 operates to initialize and trouble shoot the switch 10. In an alternative embodiment, the embedded system 34 operates additionally to process a predetermined set of received packet types, for example system management packets using the SNMP ("Simple Network Management Protocol") format.

In a further embodiment, the NVRAM 38 is a computer readable medium within a computer program product, such as a CDROM or floppy disk. In another embodiment, the code image executed by the microprocessor 36 is executed directly from NVRAM 38. As an alternative to such storage in a nonvolatile store, the code image executed by the microprocessor 36 in the embedded system 34 may be delivered by a signal received through one or more of network connections 28, for example as a source or executable code segment propagated over a local or wide area network, such as the internet 16 as shown in FIG. 1, for example via a carrier wave.

Figure 3:
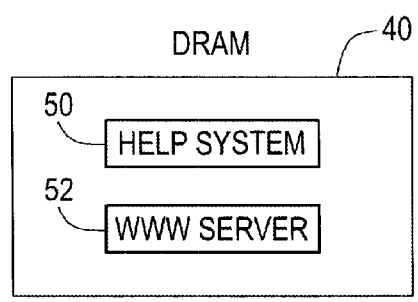
FIG. 3 is a block diagram showing an example embodiment of software components in an embedded system memory.

FIG. 3 depicts software components in an embedded system memory, for example in DRAM 40 as shown in FIG. 2. The DRAM 40 is shown including a help system portion 50 and a worldwide web (WWW) server 52. The WWW server 52, for example, supports and processes the Hypertext Transport Protocol (HTTP). The WWW server 52 facilitates data exchange with other devices coupled to the internet, and provides clients or users access to files which can include text, graphics, sound, video, etc., using a standard page description language referred to as the Hyper-Text Mark-up Language (HTML).

During operation, the help system 50 forms pages for use in response to messages generated by the WWW server 52. The response messages are for example in response to request messages received from client systems on the internet using the HTTP protocol to obtain HTML pages containing information regarding the set-up, configuration, performance statistics, or other information regarding the network switch 26.

Figure 4:
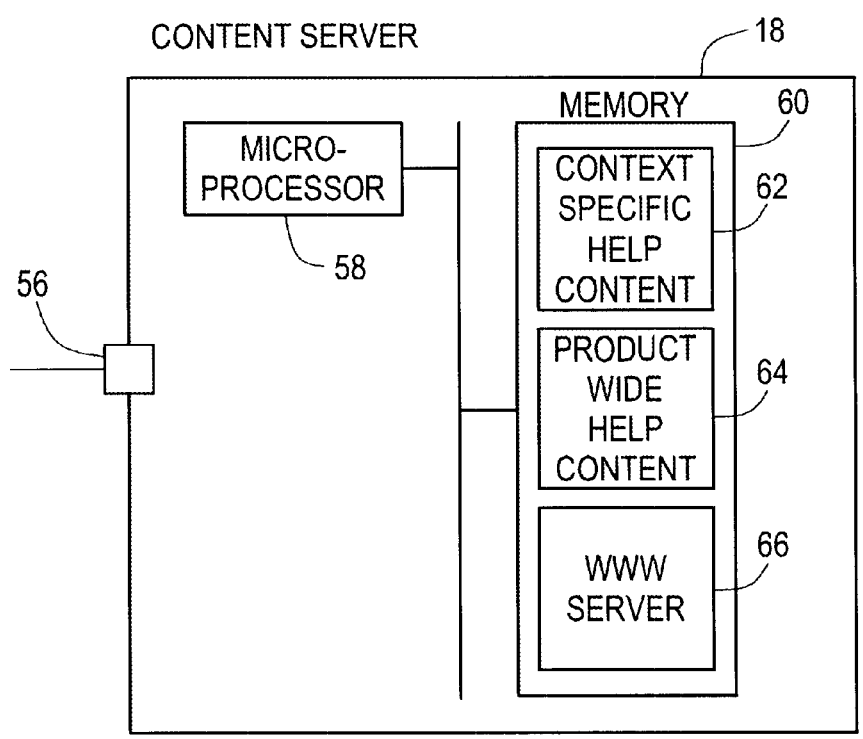
FIG. 4 is a block diagram showing an example embodiment of a content server system.

FIG. 4 illustrates the content server 18 of FIG. 1 in greater detail. More specifically, FIG. 4 shows content server 18 having a microprocessor 58, a memory 60, and a network connection 56. The memory 60 is shown including a worldwide web server computer program 66, context specific help content 62, and product wide help content 64. The context specific help content 62 and product wide help content 64 for example include video, digitized audio and other multimedia files describing aspects of the operation of the network switch 26 shown in FIG. 2. The world wide web server 66 supports and processes the Hypertext Transport Protocol (HTTP) to provide similar functionality for the content server 18 as provided by the world wide web server 52 for the embedded system as described above with respect to FIG. 3.

Figure 5:
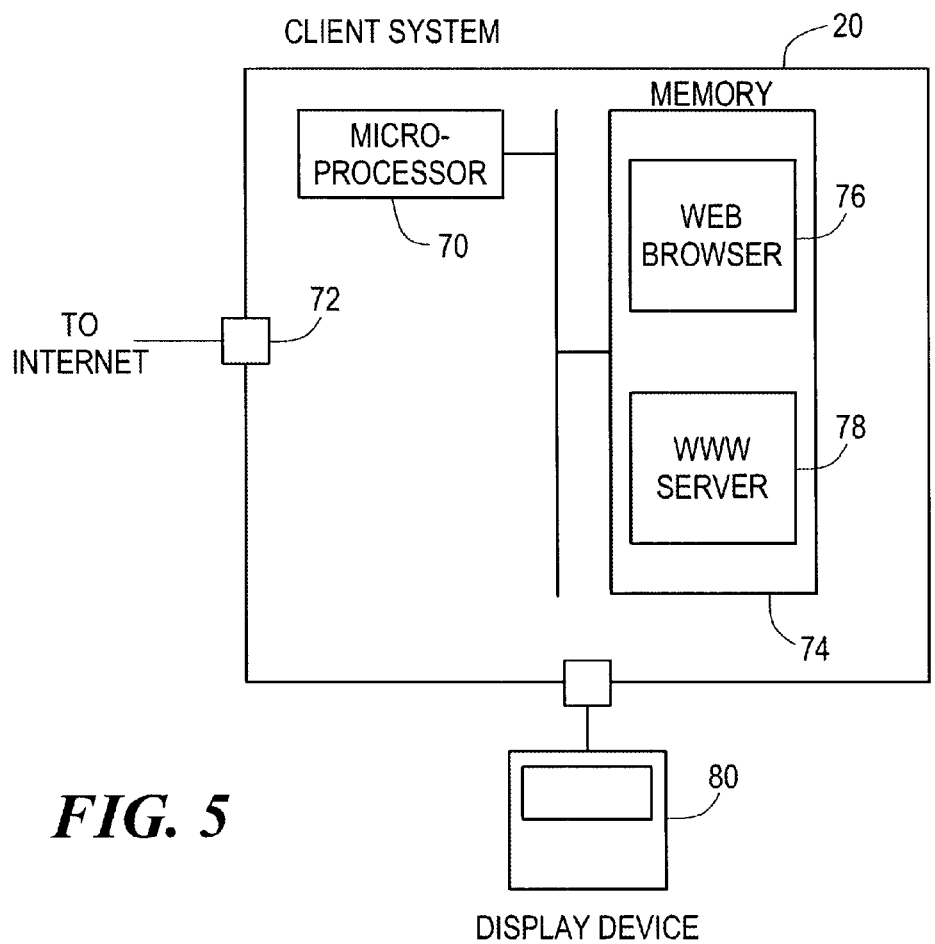
FIG. 5 is a block diagram showing an example embodiment of client system.

FIG. 5 is an example embodiment of a client system such as client system 20 as shown in FIG. 1. In FIG. 5, client system 20 is shown including a microprocessor 70, a memory 74, and a network connection 72, for example coupled to the internet. The client system 20 of FIG. 5 is further shown coupled to a display device 80, such as for example a monitor or video terminal.

The memory 74 is shown including a worldwide web server computer program 78 and a web browser computer program 76. The web server 78 provides for the client system the same functionality as is performed by the world wide web server 52 for the embedded system in FIG. 3. The web browser 76 provides a user of the client system 20 with a graphical user interface (GUI) to information in nodes connected to the internet. The browser permits the user of the client system to access files in the form of documents and pages on remote systems. A uniform resource locator or URL is used by the web browser 76 to identify a specific server node or a resource on a server node. The capabilities of the web browser 76 for example include (1) the ability to communicate with other computers using HTTP, and (2) the ability to process and present HTML documents to the user via a graphical user interface. Further browser capabilities include the capability to process a variety of data types through software components referred to as "controls" or "plug-ins". In this way, the web browser 76 processes a wide variety of multi-media content files. The web browser 76 may further be provided with a command interpreter or "virtual machine" for interpreting and executing a code stream at run time. In this way, the web browser includes the capability to process byte code or source code instructions that are embedded in a web page.

Figure 6:
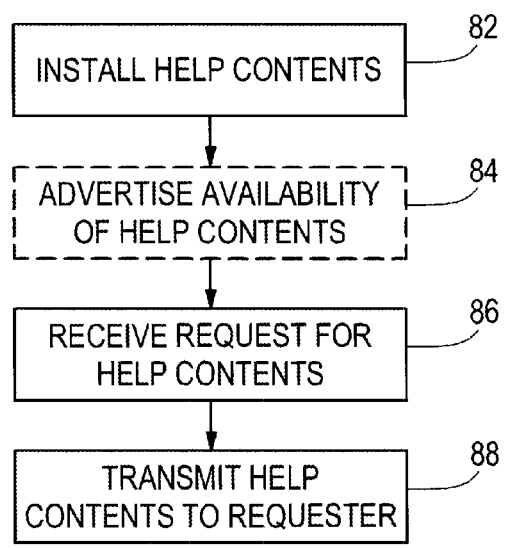
FIG. 6 is a flow chart showing steps performed by an example embodiment of a content server system.

FIG. 6 shows the operation of an exemplary embodiment of the server system 18 as shown in FIGS. 1 and 4. At step 82 one or more help content files are installed on the content server, for example corresponding to context specific help content 62 and product wide help content 64 as shown in the memory 60 of FIG. 4. Step 84 follows step 82 in an alternative embodiment in which the location of the server system is determined by the embedded system and/or the client system through the content server advertising the availability of the installed help content files over the internet. In another alternative embodiment, the location of the server system is known to the user on the client system, and communicated from the client system to the embedded system via the internet.

At step 86, the server system receives a request for help contents, for example from a client system in the form of an HTTP request. At step 88, the server system transmits one or more pages of data to the client system, for example including portions of the context specific help content file 62 and/or portions of the product wide help content files 64 as shown in FIG. 5.

Figure 7:
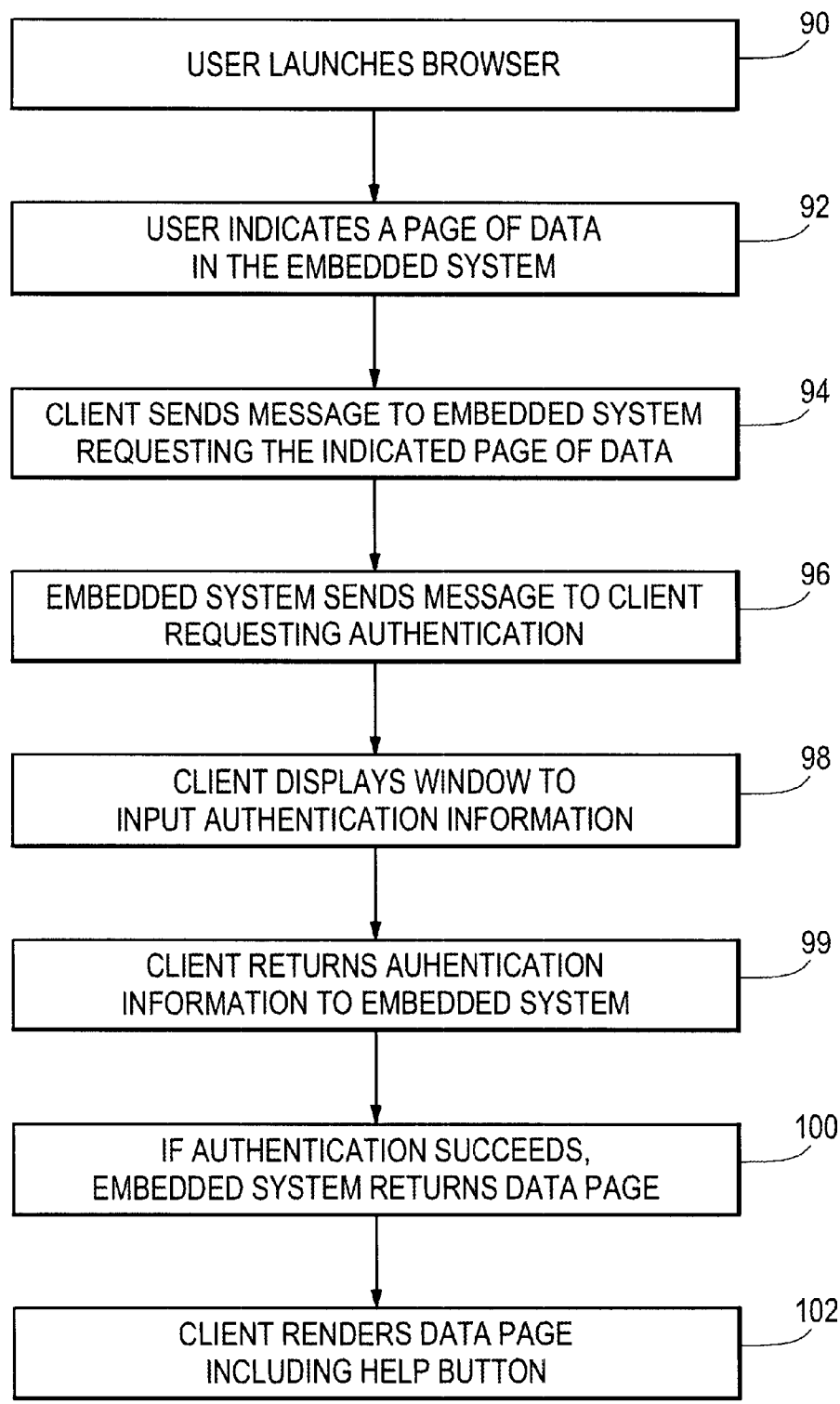
FIG. 7 is a flow chart showing steps performed in an. example embodiment of the disclosed system.

FIG. 7 shows steps performed by an exemplary embodiment of the disclosed system. At step 90, a user at a client system, for example at client system 20 as shown in FIG. 5, launches a web browser on the client system. At step 92, the user specifies a page of data stored in the embedded system, for example a page of data stored in the DRAM 40 in the embedded system 34. A page of data stored in the embedded system, is sometimes referred to as an "embedded form". For purposes of example, the user specifies the page of data in the embedded system by passing a URL of the desired page to the web browser on the client system.

At step 94 the client system sends a message, for example over the internet, to the embedded system requesting the page of data specified by the, user in step 92 by transmitting an HTTP request message to the embedded system requesting the page of data via the web browser within the client system.

At step 96, the embedded system sends a message to the client requesting authentication. At step 98 the client system displays a window to input authentication information from the user of the client system. At step 99, the client system returns the authentication information to the embedded system. Exemplary authentication information may include a user name, password, node name or address of the client system. The embedded system then checks the received authentication information against an authentication user database or list stored within the embedded system. If the provided authentication information matches information found in the authenticated user database, then at step 100 the embedded system returns a data page to the client system. The data page returned by the embedded system at step 100 is in the present example, in HTML format. At step 102, the client, by means of a web browser, renders the data page on a display device coupled to the client system. The displayed data page includes a graphical representation of a "help" button, which may be clicked by the user to obtain more information pertaining to the subject matter in the remainder of the data page. If the data page received from the embedded system is a dialog box requesting the client to provide settings for one or more timers or clocks located within the device containing the embedded system, clicking on the help button using an input device such as a mouse or track ball would result in further information regarding those timers or clocks being displayed or otherwise output. While a button on a page is used in the presently disclosed embodiment, other interface mechanisms may be used.

Figure 8:
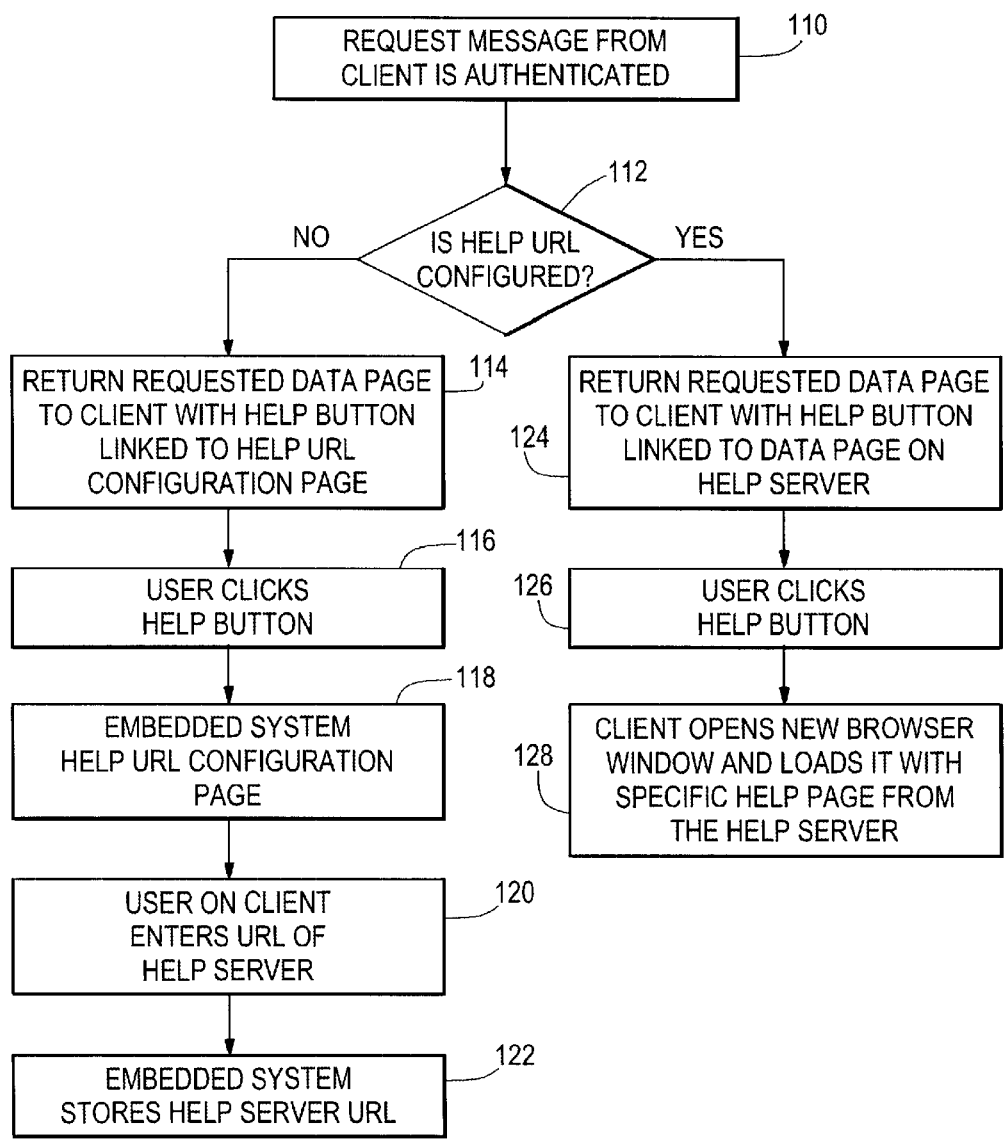
FIG. 8 is a flow chart showing steps performed in an example embodiment of the disclosed system.

FIG. 8 is a flow chart illustrating the operation of an embodiment of the disclosed system. At step 110, the embedded system authenticates a request message from the client system requesting a page of data. If the request message is authenticated, then step 110 is followed by step 112. At step 112, the embedded system determines if a "help URL" indicating the location of a help file or help files on a content server has been configured so that such URL is known to the embedded system. If the URL of the help files is known to the embedded system, step 112 is followed by step 124, in which the embedded system returns a data page to the client including instructions to display a help button linked to help content files on the server system.

Each embedded form stored within the embedded system is given a unique topic identifier. The topic identifier is used for mapping context specific help information to the specific embedded form. Accordingly a "URL" linking help files to a help button in an embedded form includes three unique pieces:

"Server Location"

"Release Identifier" and

"IIHTML Topic"

For example, a link to a "System Time" context specific 545 help file, with a server location of HTTP://158.101.101.81/new_help/, in a "SampleSWImage 1000 1.1 release", would be indicated by the following URL: HTTP://158.101.101.81/new_help/si1000_1_1_System_Time.html Advantageously, a subsequent release of the help files in the contents server can be installed within the same directory as previous releases due use of the release number contained within the URL mapping.

At step 126 a user on the client system selects the help button displayed as part of the data page displayed on the client system. At step 128 the web browser on the client system processes code associated with the help button in the data page received from the embedded system and as a result obtains a portion of the help data files on the content server. The web browser then opens a new browser window, and loads it with specific help information received from the help server.

If at step 112 the embedded system determines that the URL of the content server is not configured in the embedded system, at step 114 the embedded system returns a data page to the client system, where the data page includes instructions for displaying a help button as part of a display on the client system. The help button in this case is linked to instructions in the data page which request a "help URL configuration page" capable of prompting the user on the client system for a URL of a content server.

At step 116 the user clicks on the help button displayed as part of the data page provided by the embedded system. The browser processes the instructions in the web page associated with the help button and as a result requests a page of data from the embedded system. The embedded system responds with a page of data to the browser on the client system. When the client system displays the page of data, a "help URL configuration page" is displayed on the client system display device. At step 120, in response to the help URL configuration page, the user on the client system enters the URL of the help content files on the server system. The to browser on the client system then sends the URL of the files to the embedded system, which stores the URL at step 122.

Figure 9:
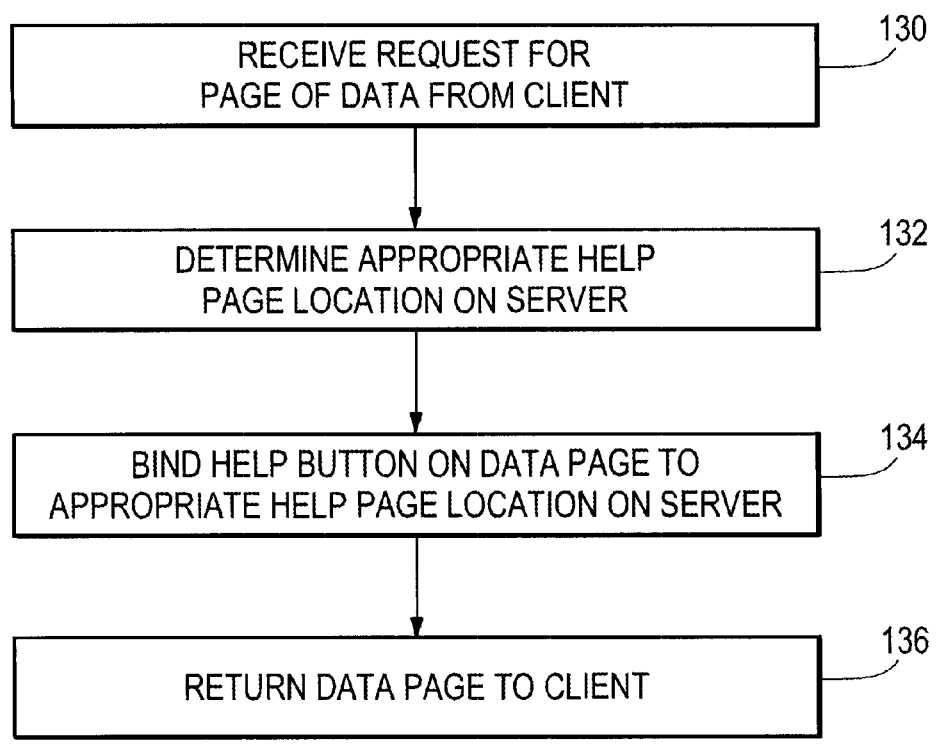
FIG. 9 is a flow chart showing steps performed in an example embodiment of the disclosed system.

FIG. 9 shows steps performed by an example embodiment of the embedded system. At step 130, the embedded system receives a request from the client system for a page of data. For example, the embedded system receives a request for a page of data stored in the embedded system which forms a dialog box allowing the user of the client system, such as a system administrator, to modify parameters associated with a system time as maintained within the device or product in which the embedded system is contained. At step 132, the embedded system determines an appropriate, context specific portion of the help files on the help.server. For example, the embedded system determines the URL of a file on the content server which provides multi-media information regarding the parameters associated with a system time.

At step 134, the embedded system forms a data page in which a help button is bound to the URL of the content file on the content server containing the context specific help information. At step 136, the embedded system returns the data page to the client system including the help button binding to the context specific help information on the help server.

Figure 10:
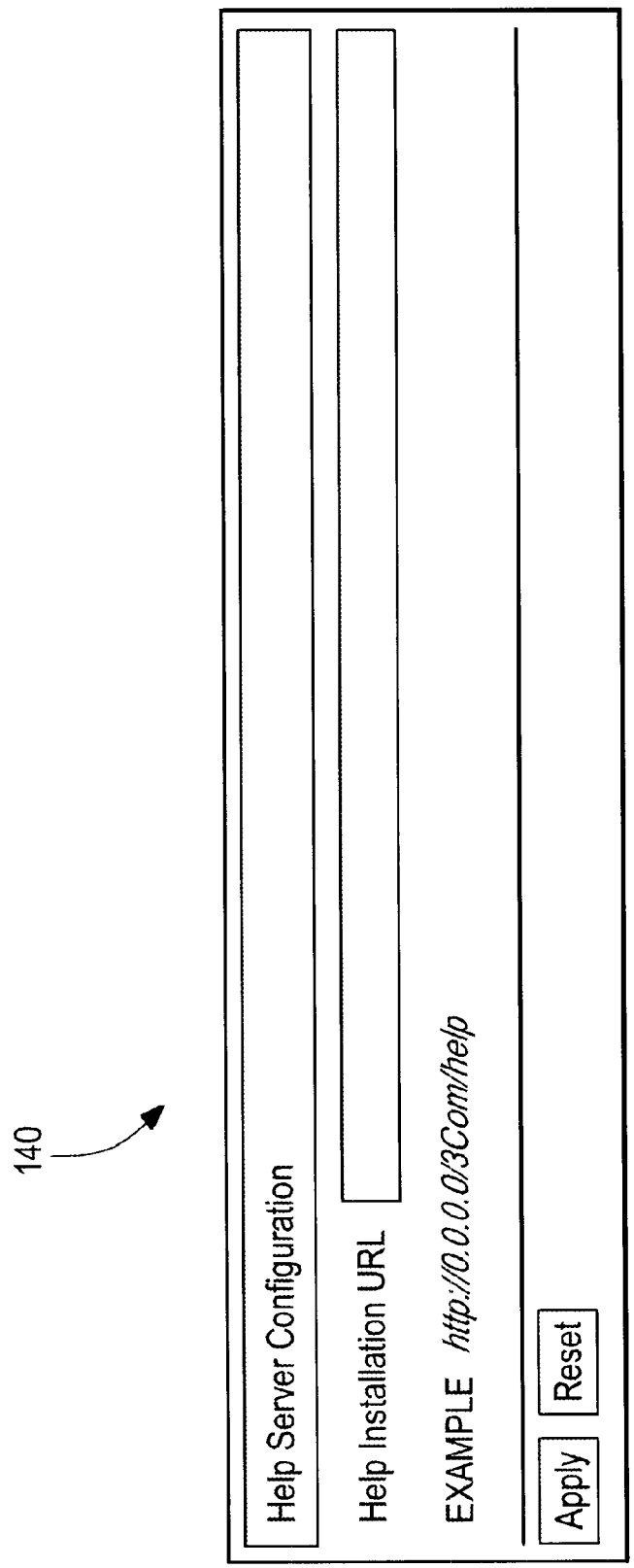
FIG. 10 is a screen display showing a help server configuration dialog box as generated by an example embodiment.

FIG. 10 shows an example help URL configuration page 140. In FIG. 10, the location of the content server is displayed in the help installation URL line. The user is permitted to change the URL by entering a new URL and clicking on either the apply or the reset button.

Figure 11:
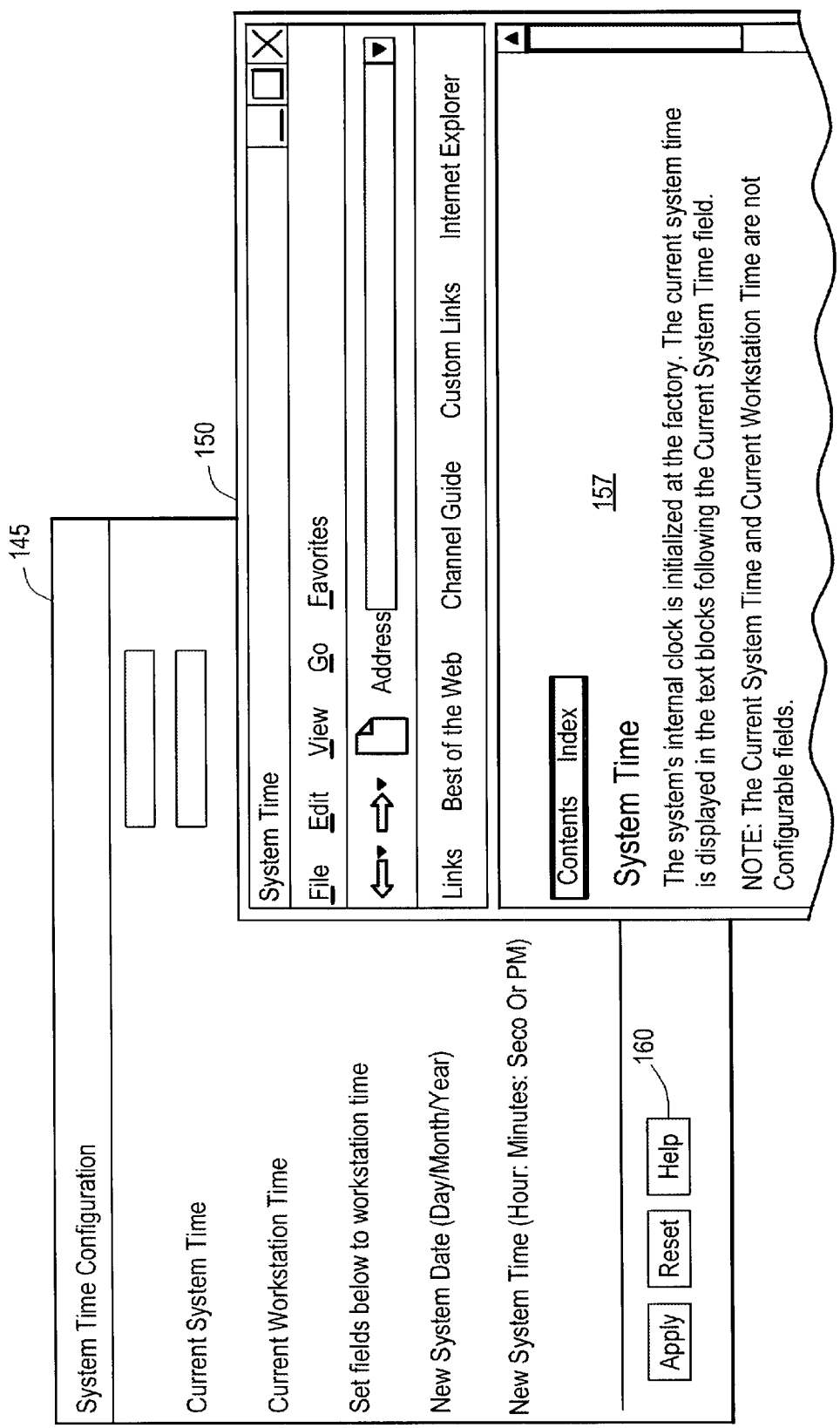
FIG. 11 is a screen display showing a configuration and associated help window displays in an example embodiment.

FIG. 11 illustrates a screen display 145 permitting a user on the client system to modify the parameters associated with the system time of the device which contains the embedded system. The server display 145 is for example a display of a page of data obtained from the embedded system also referred to as an "embedded form". Also shown in FIG. 11, is a help window 150 displaying help contents 157 obtained from a content server. The help window 150 is for example displayed in response to a user clicking on the help button 160 in the screen display 145.

Figure 12:
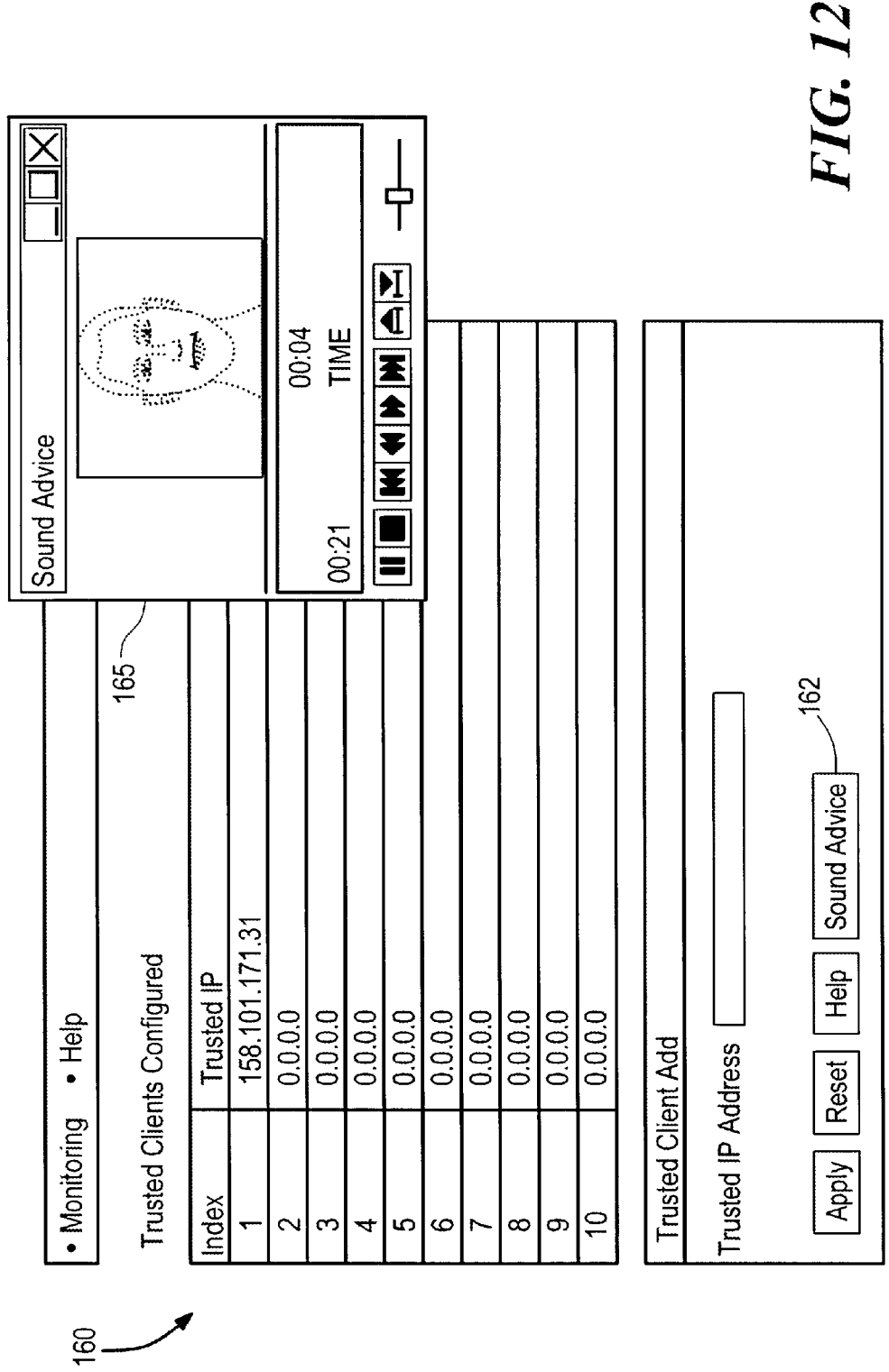
FIG. 12 is a screen display showing an example of a multimedia pop up window as provided by an example embodiment of the disclosed system.

FIG. 12 shows an embedded form 160 displayed by the client system 12 and further shows a sound advice button 162 on the embedded form 160 as displayed on the client system display device. A window 165 providing multi-media content received from the content server is shown displaying a video clip related to the contents of the embedded from 160.

Those skilled in the art should readily appreciate that the programs defining the functions of the present invention can be delivered to a computer in many forms; including, but not limited to: (a) information permanently stored on nonwritable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media such as computer or telephone networks via a modem. While the invention is described through several example embodiment it will be understood by those of ordinary skill in the art that modification to and variations of the disclosed embodiments may be made without departing from the inventive concepts herein disclosed. Accordingly, the invention should not be viewed as limited except as by the scope and spirit of the appended claims.

What is claimed is:

1. A method for providing help information to a client system, comprising:

requesting, by said client system, a page of data stored in a remote system coupled to said client system and a server system via a network;

determining, by said remote system, whether help contents are configured in association with said page of data;

in the event that said remote system determines that help contents are not configured in association with said page of data, obtaining a location of at least one help contents file from said client system;

configuring, by said remote system, said location of said at least one help contents file in association with said requested page of data;

forming, by said remote system, responsive to said request for said page of data stored in said remote system, a data page, wherein said data page includes at least one instruction for displaying a help button, and wherein said data page includes at least one instruction associating said location of said at least one help contents file with said help button, and wherein said data page further includes said requested page of data;

transmitting said data page to said client system;

processing said data page on said client system, wherein said processing includes display of said help button within a display window containing said requested page of data;

requesting, by said client system, responsive to selection of said help button by a user, said at least one help contents file from a remote help contents server indicated by said location of said at least one help contents file; and receiving and outputting said at least one help contents file by said client system.

2. The method of claim 1, wherein said remote system is an embedded system.

3. The method of claim 2, wherein said obtaining includes displaying a configuration dialog box on said client system, said configuration dialog box operable to receive said location of said at least one help contents file from a user interface of said client system.

4. The method of claim 3, wherein said obtaining further comprises transmitting said location of said server system received from said client system to said embedded system.

5. The method of claim 1, further comprising transmitting at least one message from said remote help contents server system to said embedded system, wherein said message indicates a location of said at least one help contents file.

6. The method of claim 5 wherein said transmitting said at least one message includes broadcasting one or more announcement messages from said server system, said announcement messages indicating that said at least one help contents file has been installed on said remote help contents server system.

7. The method of claim 2 wherein said requesting includes sending an HTTP request from a browser program on said client system to said embedded system, responsive to an indication of said location of said embedded system to said browser program from a user interface on said client system.

8. The method of claim 7 wherein a user indicates said location of said embedded system to said browser program by entering a URL of a device containing said embedded system to said browser program.

9. The method of claim 2 wherein said data page is in HTML format.

10. The method of claim 9 wherein said outputting includes rendering said data page on said display device responsive to processing said data page by a browser program on said client system.

11. The method of claim 1 wherein said at least one help contents file is in HTML format.

12. The method of claim 1 wherein said at least one help contents file includes sound data.

13. The method of claim 1 wherein said at least one help contents file includes graphics data.

14. The method of claim 1 wherein said at least one help contents file includes video data.

15. The method of claim 2 wherein said embedded system is within a network switch.

16. The method of claim 2 wherein said embedded system is within a household appliance.

17. The method of claim 1 wherein said one or more instructions associating said at least one help contents file with said help button include a uniform resource location (URL) having a server location field, release identifier field, and a topic field that is a unique identifier associated with said data page.

18. The method of claim 17 wherein a contents of said release identifier field is a release number associated with said at least one help contents file.

19. The method of claim 17 wherein a directory in said server system stores said at least one help contents file and a previous release of said content file.

20. The method of claim 17 wherein said at least one help contents file contains information relating to the topic of said data page.

21. The method of claim 2 wherein said data page is an embedded form.

22. A system for providing help information to a plurality of client systems, comprising:
  a help system operable to:
  execute within at least one remote system,
  determine, in response to receipt of a request for a page of data from a client system, whether help contents are configured in association with said page of data,
  in the event that said remote system determines that help contents are not configured in association with said page of data, obtain a location of at least one help contents file from said client system,
  configure said location of said at least one help contents file in association with said requested page of data,
  generate and transmit a data page to said plurality of client systems, wherein said data page includes at least one instruction which forms a help button when said data page is processed by one or more of said plurality of client systems, wherein said processing includes display of said help button within a display window containing said requested page of data, and wherein said data page further includes at least one instruction operable to obtain said at least one help contents file from a remote help contents server system indicated by said location of said at least one help contents file, responsive to assertion of said help button through a user interface on at least one of said client systems.

23. The system of claim 22, wherein said remote system is an embedded system.

24. The system of claim 22, wherein said help system is further operable to obtain said location of said remote help contents server system by receiving a network location of said remote help contents server system from at least one of said client systems.

25. The system of claim 22, wherein said help system is further operable to receive a network location of said help contents server system from said help contents server system.

26. The system of claim 22 wherein said data page is in HTML format.

27. The system of claim 23 wherein said at least one instruction operable to obtain at least a portion of said at least one help contents file from said server system include at least a portion of a URL of said at least one help contents file.

28. The system of claim 22 wherein said at least one help contents file is in HTML format.

29. The system of claim 22 wherein said at least one help contents file includes sound data.

30. The system of claim 22 wherein said at least one help contents file includes graphics data.

31. The system of claim 22 wherein said at least one help contents file includes video data.

32. The system of claim 23 wherein said embedded system is within a network switch.

33. The system of claim 23 wherein said embedded system is within a household appliance.

34. The system of claim 22 wherein said at least one instruction operable to obtain at least a portion of said at least one help contents file from said server system include a uniform resource location (URL) having a server location field, release identifier field, and a topic field that is a unique identifier associated with said data page.

35. The system of claim 34 wherein a contents of said release identifier field is a release number associated with said at least one help contents file on said server system.

36. The system of claim 34 wherein a directory in said remote help contents server system stores said at least one help contents file and a previous release of said content file.

37. The system of claim 34 wherein said at least one help contents file contains information relating to the topic of said data page.

38. The system of claim 34 wherein said data page is an embedded form.

39. A computer program product including a computer readable medium, said computer readable medium having a computer program for providing help information to a plurality of client systems stored thereon, said computer program comprising:
  program code operable to:
  execute within at least one remote system,
  determine, in response to receipt of a request for a page of data from a client system, whether help contents are configured in association with said page of data,
  in the event that said help contents are not configured in association with said page of data, obtain a location of at least one help contents file from said client system,
  configure said location of said at least one help contents file in association with said requested page of data,
  generate and transmit a data page to said plurality of client systems, wherein said data page includes at least one instruction which forms a help button when said data page is processed by one or more of said plurality of client systems, wherein said processing includes display of said help button within a display window containing said requested page of data, and wherein said data page further includes at least one instruction operable to obtain said at least one help contents file from a remote help contents server system indicated by said location of said at least one help contents file, responsive to assertion of said help button through a user interface on at least one of said client systems.

40. A computer data signal embodied in a carrier wave said computer data signal including a computer program for providing help information to a plurality of client systems stored thereon, said computer program comprising:

program code operable to:
- execute within at least one remote system,
- determine, in response to receipt of a request for a page of data from a client system, whether help contents are configured in association with said page of data,
- in the event that said help contents are not configured in association with said page of data, obtain a location of at least one help contents file from said client system,
- configure said location of said at least one help contents file in association with said requested page of data,
- generate and transmit a data page to said plurality of client systems, wherein said data page includes at least one instruction which forms a help button when said data page is processed by one or more of said plurality of client systems, wherein said processing includes display of said help button within a display window containing said requested page of data, and wherein said data page further includes at least one instruction operable to obtain said at least one help contents file from a remote help contents server system indicated by said location of said at least one help contents file, responsive to assertion of said help button through a user interface on at least one of said client systems.

41. A system for providing help information to a plurality of client systems, comprising:

a help system means for executing within at least one remote system, said help system means operable to:
- determine, in response to receipt of a request for a page of data from a client system, whether help contents are configured in association with said page of data,
- in the event that said help contents are not configured in association with said page of data, obtain a location of at least one help contents file from said client system,
- configure said location of said at least one help contents file in association with said requested page of data,
- generate and transmit a data page to said plurality of client systems, wherein said data page includes at least one instruction which forms a help button when said data page is processed by one or more of said plurality of client systems, wherein said processing includes display of said help button within a display window containing said requested page of data, and wherein said data page further includes at least one instruction operable to obtain said at least one help contents file from a remote help contents server system indicated by said location of said at least one help contents file, responsive to assertion of said help button through a user interface on at least one of said client systems.

* * * * *

UNITED STATES PATENT AND TRADEMARK OFFICE
CERTIFICATE OF CORRECTION

PATENT NO. : 6,289,370 B1
DATED : September 11, 2001
INVENTOR(S) : Gregory Panarello et al.

It is certified that error appears in the above-identified patent and that said Letters Patent is hereby corrected as shown below:

Column 2,
Line 49, "server'" should read -- server --;

Column 3,
Line 14, "an." should read -- an --;

Column 5,
Line 45, "the," should read -- the --;

Column 6,
Line 33, "IIHTML Topic" should read -- HTML Topic --;
Line 35, please delete "545";

Column 7,
Lines 6-7, "The to browser on" should read -- The browser on --; and
Line 20, "help.server." should read -- help server. --.

Signed and Sealed this

Seventh Day of May, 2002

Attest:

Attesting Officer

JAMES E. ROGAN
*Director of the United States Patent and Trademark Office*